Patented Jan. 28, 1947

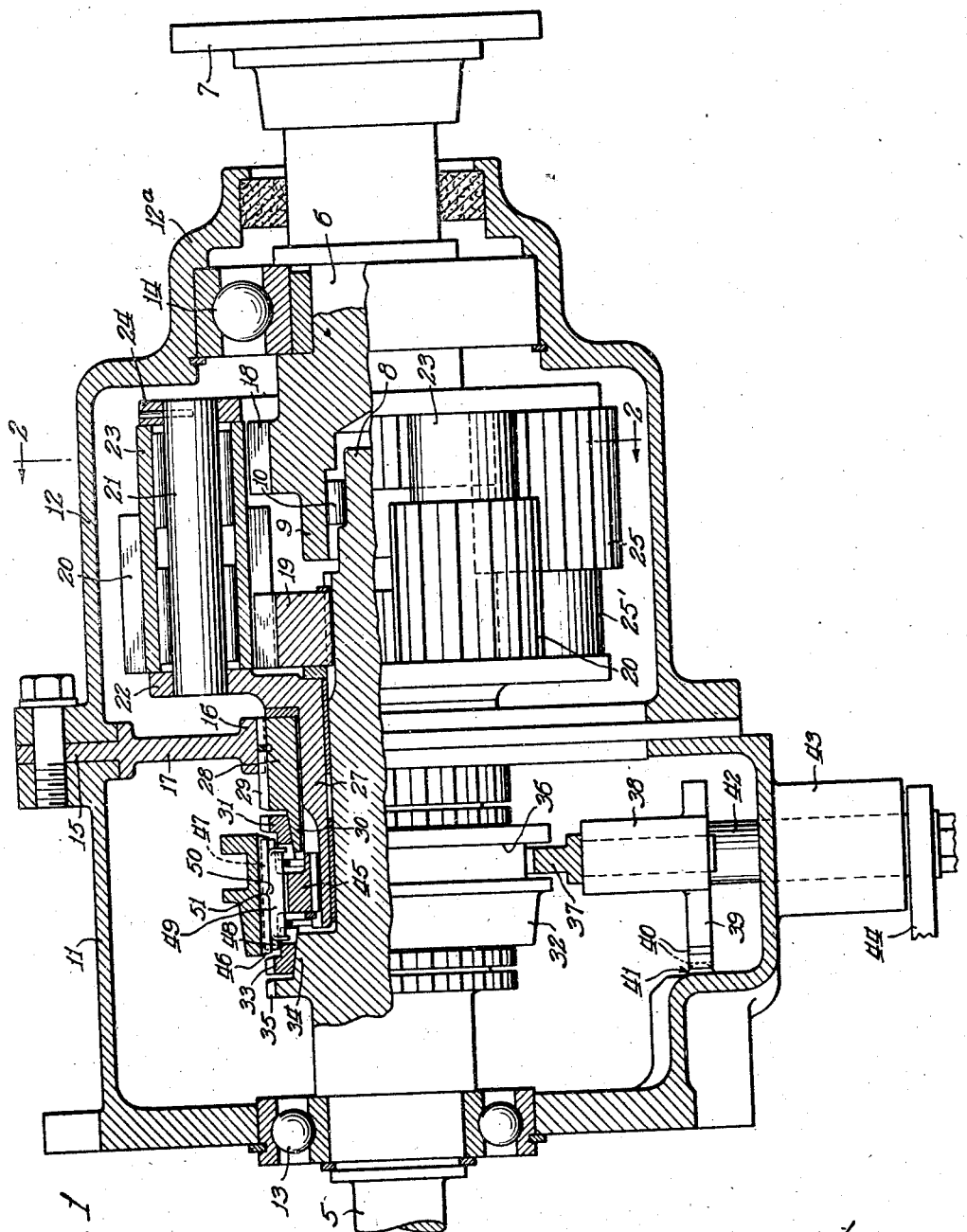

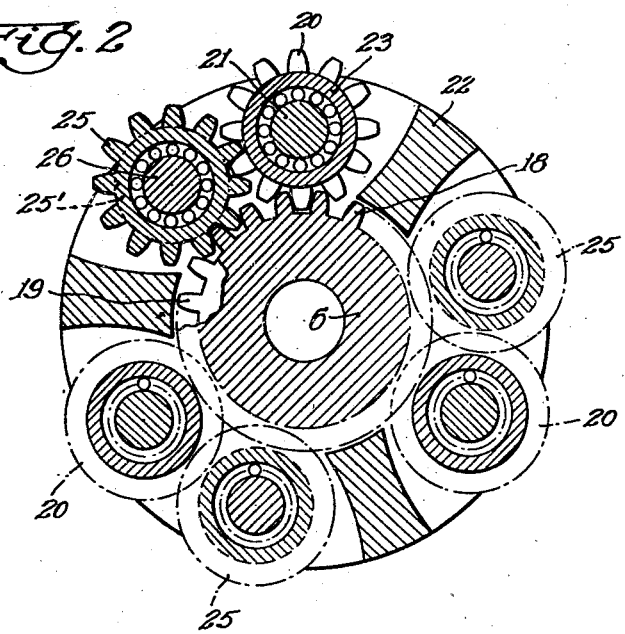
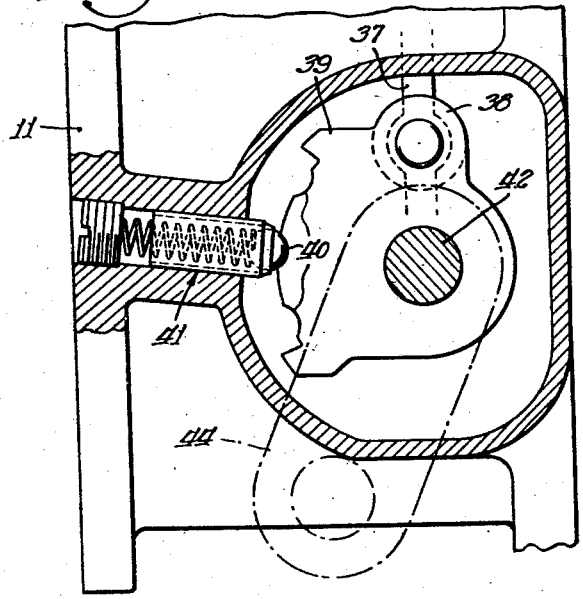

2,414,832

UNITED STATES PATENT OFFICE 2,414,832

PLANETARY REVERSE GEAR

Palmer Orr, Muncie, Ind., assignor to Borg-Warner Corporation, Chicago, Ill., a corporation of Illinois Application January 13, 1944, Serial No. 518,036

2 Claims. (Cl. 74—298)

The present invention relates to reversing means for transmissions and similar gearing. The improvements are more particularly directed to a reversing gear of the planetary type wherein a synchronizer is employed for both the clutching and the braking means.

The reversing gear structure which is contemplated herein is adapted to actuating the propeller of a small boat such as a launch, surf-boat, and the like for the purpose of driving the boat ahead or astern. The shifting of the gears and the engagement of the brake for either forward or reverse movement of the driven shaft is accomplished by a single control lever that is moved in either of two directions from a neutral or intermediate position.

One of the principal objects of the present invention is to simplify the construction of a planetary reversing gear such as contemplated herein, and to improve the operation and efficiency of such apparatus.

Another object of the present invention resides in providing a planetary reversing gear that employs a blocker-type synchronizer for both the clutching and the braking means.

It is also an object of the present invention to provide a planetary reversing gear that is adapted for cooperative assembly with an engine clutch.

In the present transmission the sun gears are of the same size and are disposed in close relationship to each other upon the respective drive and driven shafts, and the planet gears are elongated so that each gear, while meshed with a sun gear will also be in mesh with an intermediate planet gear. This permits the use of relatively smaller planet gears than are usually employed which lightens the weight of the transmission assembly, and by reason of a triple arrangement of these gears the assembly will materially assist in equalizing and distributing the load.

Additional objects, aims and advantages of the present invention will be apparent to persons skilled in the art after the construction and operation of the improved reversing gear structure is understood from the within description.

It is preferred to accomplish the numerous objects of this invention, and to practice the same, in substantially the manner hereinafter fully described and as particularly pointed out in the appended claims, reference being made to the accompanying drawings that form a part of this specification, wherein:

Fig. 1 is a longitudinal vertical section partly in elevation, taken through the axes of the drive and driven shafts of a planetary gearing assembly embodying the instrumentalities of the present invention, the view also disclosing the synchronizer for gear reversal in axial section;

Fig. 2 is a transverse section of the structure shown in Fig. 1, taken on the plane of line 2—2 on Fig. 1 and looking in the direction of the arrows; and Fig. 3 is a detail view of the rocker structure for operating the shift collar.

These drawings are to be understood as being more or less of a schematic character for the purpose of disclosing a typical or preferred embodiment of the improvements contemplated herein, and in these drawings like reference characters identify the same parts wherever these parts appear in the different views.

The instrumentalities for practicing the present invention, as shown in Fig. 1, comprise a drive shaft 5, having suitable operative connection with a motor or engine (not shown), and a driven shaft 6 disposed in axial alinement with drive shaft 5 and having operative connection with the propeller shaft (not shown) of the boat or other conveyance through the medium of a detachable coupling member 7 splined to the outer end of said driven shaft 6. The proximate end portions of these shafts 5 and 6 are preferably piloted the one in the other within a stationary housing. As shown, the drive shaft 5 has a reduced portion 8 that enters a hollow cupped or bell-shaped end portion 9 of driven shaft 6, and suitable anti-friction rollers 10 are interposed between adjacent portions of said shafts to journal and aline said shafts.

The stationary housing is a two-part structure consisting of hollow cylindrical sections 11 and 12, the former, 11, having an opening in its end wall to seat a ball-bearing assembly 13 for journaling the adjacent portion of drive shaft 5, and the end of the other housing section 12 has a hollow axial boss 12a that seats a ball-bearing assembly 14 to journal the adjacent portion of driven shaft 6. The adjacent edges of the housing sections 11 and 12 are bolted together upon opposite sides of an intermediate annular flange 15 having internal splines 16 that form one of the components of the transmission brake structure. The flange 15 has a relatively wide web or body portion 17 between splines 16 and the outer shell of housing 11 which positions the splines adjacent and surrounding the drive shaft 5. Web 17 divides the interior of the housing into two axially alined compartments or chambers, one of which encloses the planetary transmission assembly and the other of which encloses the control mechanism. This permits a housing member to be dismounted for ready access to the enclosed assembly without disturbing the other member.

The driven sun gear 18 of the transmission assembly is preferably formed integrally upon the exterior of the bell portion 9 of driven shaft 6, and the driving sun gear 19 is splined to drive shaft 5 adjacent its reduced piloted end 8. These sun gears 18 and 19 preferably are of the same size and they are provided with the same number of teeth. The driving sun gear 19 is meshed with elongated planet gears 20 that rotate upon spindles 21 projecting laterally from a disk-shaped carrier plate 22. These planet gears 20 have reduced end portions 23 that are remote to the carrier plate 22, so that they will clear the teeth of the driven sun gear 18, and the outer ends of these planet gears abut a carrier retainer ring 24 that is pinned to the adjacent ends of the spindles 21.

Intermediate the planet gears 20 there is a second set of elongated planet gears 25 that are rotatably mounted upon lateral spindles 26 projecting from the carrier plate 22 in the same manner as the other spindles 21 and have their opposite ends mounted in the ring 24. The second planet gears 25 extend between plate 22 and the ring 24. These second planet gears mesh with the driven sun gear 18, and have reduced end portions 25' adjacent the carrier 22 to clear the driving sun gear 19. As seen in Figs. 1 and 2, portions of the planet gears 20 and 25 are disposed so that they have their teeth overlapping and in mesh with each other to transmit the torque of driving sun gear 19 to the driven sun gear 18.

The carrier plate 22 is provided with a hollow sleeve or axial hub 27 surrounding the adjacent portion of the drive shaft 5 and passing through the splined opening in intermediate flange 15 in the manner shown in Fig. 1. A relatively wide cooperating brake element 28 surrounds this sleeve 27 and its wide teeth 29 are meshed with the stationary internal splines 16. The end of brake element 28 that projects into housing member 11 is reduced and provided with a tapered synchronizer cone 30 to receive the correspondingly tapered bore of the blocker ring 31 with which it is adapted to be frictionally engaged whenever the shift collar 32 is moved to the right in Fig. 1. Another blocker ring 33 is mounted with its tapered bore upon a correspondingly tapered synchronizer cone 34 on the drive shaft 5 and alongside this blocker ring 33 are teeth 35 that are preferably formed integrally with the drive shaft 5.

The shift collar 32 has an annular groove 36 adapted to be engaged by a shift pin or yoke 37 rotatably carried in a bearing boss 38 on a rotary reciprocable plate 39 having a series of notches 40 in its edge to be selectively engaged by a poppet 41 that determines when the assembly is in the neutral, forward or reverse positions. This plate 39 is secured to a short rock shaft 42 journaled in a bearing boss 43 on housing member 11 and is actuated by a rocker arm 44 that is manually operated in any suitable manner. The shift pin or yoke 37 projects laterally from the indexing plate with its axis parallel to the axis of the rocker shaft 42 and is eccentric thereto in order that an arcuate movement is imparted to said pin 37 when the rocker shaft is rotated in one direction or the other.

The shift collar 32 of the synchronizer assembly is slidably mounted for movement in transverse directions parallel to the axis of the drive shaft 5 and bodily with respect to a flanged hub 45 that is splined and anchored by means of a snap ring to the adjacent end portion of the elongated sleeve 27 of carrier 22. In order to permit of this bodily sliding movement the shift collar has internal teeth or splines 46 that engage external teeth or splines 47 on the flange 48 of hub 45. A strut element 49, of a wide or flattened U-shape, is carried by the hub flange 48 and has an offset or hump 50 intermediate its ends that is adapted to enter a shallow depression 51 on the inner surface of the shift collar 32 and acts to normally bias one or the other of the blocker rings to engaged position on their respective cones when the collar is moved from its neutral position. The dimensions and shapes of the hump 50 and depression 51 are such that the shift collar 32 may be readily moved out of neutral position to either forward or reverse positions when the control or gear shift lever rotates the indexing plate 39.

When the shift collar 32 is moved to the right (Fig. 1) it will lock carrier 22 to brake element 28 to maintain carrier 22 against rotation, and the drive will be from shaft 5 through the input sun gear 19, planet gears 20 reversing planet gears 25 and output sun gear 18 to the driven shaft 6 thereby establishing reverse drive. In its opposite extreme position the shift collar locks teeth 35 on drive shaft 5 to the hub 45 which in effect bodily rotates the carrier 22 and sun gear 19 at the same speed thus establishing a direct forward drive in the driven shaft 6.

While this invention has been described in detail in its present preferred form or embodiment, it will be apparent to persons skilled in the art, after understanding the improvements, that various changes and modifications may be made therein without departing from the spirit or scope thereof. It is aimed in the appended claims to cover all such changes and modifications.

I claim:

1. A reversing transmission comprising, in combination, a drive shaft and a driven shaft, planetary gearing connectible between said shafts and including a planet gear carrier, said carrier having a sleeve portion rotatable on and supported by the drive shaft, an externally toothed brake element surrounding one end of the sleeve of the carrier and being fixed against rotational and axial movement, said element thereby also serving to position said carrier against axial movement in one direction, an externally toothed clutch element secured on the other end of the sleeve portion of said carrier, external teeth on the drive shaft on the side of said toothed clutch element opposite from said brake element, and a slidable, internally toothed clutch sleeve carried by said toothed clutch element and selectively engageable with said teeth on the drive shaft to establish direct drive or with the external teeth on said brake element to establish reverse drive.

2. A reversing transmission comprising, in combination, a drive shaft and a driven shaft, planetary gearing connectible between said shafts and including a planet gear carrier, said carrier having a sleeve portion rotatable on and supported by the drive shaft, an externally toothed brake element surrounding one end of the sleeve of the carrier and being fixed against rotational and axial movement, said element thereby also serving to position said carrier against axial movement in one direction, an externally toothed clutch element secured on the other end of the sleeve portion of said carrier, external teeth on the drive shaft on the side of said toothed clutch element opposite from said brake element, a slidable, internally toothed clutch sleeve carried by said toothed clutch element and selectively engageable with said teeth on the drive shaft to establish direct drive or with the external teeth on said brake element to establish reverse drive, and blocker type synchronizers interposed on either side of said clutch sleeve to prevent a shifting movement into engagement with said gear teeth on the drive shaft or with the toothed brake element until the speed of rotation of their teeth are substantially synchronized.

PALMER ORR.